(12) United States Patent
Green

(10) Patent No.: US 9,931,929 B2
(45) Date of Patent: *Apr. 3, 2018

(54) MODIFICATION OF AN INDUSTRIAL VEHICLE TO INCLUDE A HYBRID FUEL ASSEMBLY AND SYSTEM

(71) Applicant: Jason Green, Davie, FL (US)

(72) Inventor: Jason Green, Davie, FL (US)

(*) Notice: Subject to any disclaimer, the term of this patent is extended or adjusted under 35 U.S.C. 154(b) by 245 days.

This patent is subject to a terminal disclaimer.

(21) Appl. No.: 14/521,637

(22) Filed: Oct. 23, 2014

(65) Prior Publication Data

US 2016/0114674 A1    Apr. 28, 2016

Related U.S. Application Data

(63) Continuation of application No. 14/520,848, filed on Oct. 22, 2014, now Pat. No. 9,428,047.

(51) Int. Cl.
*B60K 15/063* (2006.01)
*B60K 15/067* (2006.01)
(Continued)

(52) U.S. Cl.
CPC .......... *B60K 15/063* (2013.01); *B60K 15/067* (2013.01); *B60K 15/07* (2013.01);
(Continued)

(58) Field of Classification Search
CPC ............ B60K 15/03006; B60K 15/063; B60K 15/067; B60K 15/07; B60K 15/073
See application file for complete search history.

(56) References Cited

U.S. PATENT DOCUMENTS 2,058,309 A   10/1936   Hearing
2,831,754 A   4/1958    Manka
(Continued)

FOREIGN PATENT DOCUMENTS

CA       2741263        10/2014
WO    WO 2002/101214    12/2002
(Continued)

OTHER PUBLICATIONS

GFS Corp., First LNG Mining Truck in U.S. [online press release]. Oct. 21, 2010. Retrieved from the internet on Oct. 25, 2012: http://www.d2ginc.com/PDF/First%20LNG%20Mining%20Truck%20In%20US%20Press%20Kit%20Oct%2021.pdf.
(Continued)

*Primary Examiner* — Joseph M Rocca
*Assistant Examiner* — Maurice L Williams
(74) *Attorney, Agent, or Firm* — Malloy & Malloy, P.L.

(57) ABSTRACT

A system and attendant assembly for incorporating at least one alternate fuel supply, such as of the type used in combination with a conventional distillate fuel, to power a heavy duty industrial vehicle, such as a mine haul dump truck. The system and attendant assembly includes a mounting assembly structured for containment and support of a primary fuel tank and an auxiliary fuel tank. The mounting assembly is disposed on a mounting area laterally adjacent between the two tires on a side of the truck, wherein the mounting assembly and mounting area are cooperatively disposed and structured to facilitate storage of the alternate fuel and operative communication and distribution thereof with the powering operations of the vehicle.

25 Claims, 6 Drawing Sheets

(51) Int. Cl.
  *B60K 15/07* (2006.01)
  *B60K 15/073* (2006.01)
  *B60K 15/03* (2006.01)

(52) U.S. Cl.
  CPC ...... *B60K 15/073* (2013.01); *B60K 15/03006* (2013.01); *B60K 2015/0636* (2013.01); *B60Y 2200/142* (2013.01)

(56) References Cited

U.S. PATENT DOCUMENTS

| | | |
|---|---|---|
| 3,671,025 A | 6/1972 | Elliott |
| 3,675,901 A | 7/1972 | Rion |
| 3,761,065 A | 9/1973 | Rich et al. |
| 3,866,781 A | 2/1975 | Stedman et al. |
| 3,872,473 A | 3/1975 | Melgaard et al. |
| 4,006,852 A | 2/1977 | Pilsner et al. |
| 4,078,629 A | 3/1978 | Kutay et al. |
| 4,234,922 A | 11/1980 | Wilde et al. |
| 4,270,576 A | 6/1981 | Takeda et al. |
| 4,288,086 A | 9/1981 | Oban et al. |
| 4,335,697 A | 6/1982 | McLean |
| 4,415,051 A | 11/1983 | Taylor |
| 4,442,665 A | 4/1984 | Fick et al. |
| 4,444,373 A | 4/1984 | Hayashi |
| 4,489,699 A | 12/1984 | Poehlman |
| 4,499,885 A | 2/1985 | Weissenback |
| 4,522,159 A | 6/1985 | Engel et al. |
| 4,527,516 A | 7/1985 | Foster |
| 4,535,728 A | 8/1985 | Batchelor |
| 4,564,298 A | 1/1986 | Gritters et al. |
| 4,597,364 A | 7/1986 | Young |
| 4,603,674 A | 8/1986 | Tanaka |
| 4,606,322 A | 8/1986 | Reid et al. |
| 4,616,937 A | 10/1986 | King |
| 4,617,904 A | 10/1986 | Pagdin |
| 4,633,909 A | 1/1987 | Louboutin et al. |
| 4,641,625 A | 2/1987 | Smith |
| 4,708,094 A | 11/1987 | Helmich et al. |
| 4,753,535 A | 6/1988 | King |
| 4,770,428 A | 9/1988 | Sugiyama |
| 4,799,565 A | 1/1989 | Handa et al. |
| 4,817,568 A | 4/1989 | Bedford |
| 4,861,096 A | 8/1989 | Hastings |
| 4,955,326 A | 9/1990 | Helmich |
| 5,033,567 A | 7/1991 | Washburn et al. |
| 5,050,550 A | 9/1991 | Gao |
| 5,054,799 A | 10/1991 | Fingerle |
| 5,081,969 A | 1/1992 | Long, III |
| 5,092,305 A | 3/1992 | King |
| 5,156,230 A | 10/1992 | Washburn |
| 5,176,448 A | 1/1993 | King et al. |
| 5,215,157 A | 6/1993 | Teich |
| 5,224,457 A | 7/1993 | Arsenault et al. |
| 5,355,854 A | 10/1994 | Aubee |
| 5,356,213 A | 10/1994 | Arpentinier |
| 5,370,097 A | 12/1994 | Davis |
| 5,375,582 A | 12/1994 | Wimer |
| 5,379,740 A | 1/1995 | Moore et al. |
| 5,404,711 A | 4/1995 | Rajput |
| 5,518,272 A | 5/1996 | Fukagawa et al. |
| 5,526,786 A | 6/1996 | Beck et al. |
| 5,546,908 A | 8/1996 | Stokes |
| 5,566,653 A | 10/1996 | Feuling |
| 5,566,712 A | 10/1996 | White et al. |
| 5,593,167 A | 1/1997 | Barnhardt et al. |
| 5,598,825 A | 2/1997 | Neumann |
| 5,609,037 A | 3/1997 | Fischler |
| D384,341 S | 9/1997 | Hoffman et al. |
| 5,701,928 A | 12/1997 | Aoki |
| 5,735,253 A | 4/1998 | Perotto et al. |
| 5,755,210 A | 5/1998 | Sato et al. |
| 5,794,979 A | 8/1998 | Kasuga et al. |
| 5,806,490 A | 9/1998 | Nogi et al. |
| 5,810,309 A | 9/1998 | Augustine et al. |
| 5,845,940 A | 12/1998 | Colburn |
| 5,937,800 A | 8/1999 | Brown |
| 5,996,207 A | 12/1999 | Brown et al. |
| 6,003,478 A | 12/1999 | Huber |
| 6,027,241 A | 2/2000 | King |
| 6,041,762 A | 3/2000 | Sirosh et al. |
| 6,101,986 A | 8/2000 | Brown |
| 6,151,547 A | 11/2000 | Kumar et al. |
| 6,168,229 B1 | 1/2001 | Kooi et al. |
| 6,200,014 B1 | 3/2001 | Babenko |
| 6,202,601 B1 | 3/2001 | Ouellette |
| 6,250,260 B1 | 6/2001 | Green |
| 6,250,723 B1 | 6/2001 | Barberis et al. |
| 6,276,823 B1 | 8/2001 | King |
| 6,289,881 B1 | 9/2001 | Klopp |
| D452,693 S | 1/2002 | Mitchell |
| 6,422,735 B1 | 7/2002 | Lang |
| 6,513,485 B2 | 2/2003 | Ogawa et al. |
| 6,543,395 B2 | 4/2003 | Green |
| 6,550,811 B1 | 4/2003 | Bennett et al. |
| 6,659,636 B1 | 12/2003 | Matula |
| 6,676,163 B2 | 1/2004 | Joitescu et al. |
| 6,718,952 B2 | 4/2004 | Finch |
| 6,751,835 B2 | 6/2004 | Fenton |
| 6,766,231 B2 | 7/2004 | Nakagawa et al. |
| D496,940 S | 10/2004 | Fetterman |
| 6,863,034 B2 | 3/2005 | Kern et al. |
| 6,875,258 B2 | 4/2005 | Kuperus |
| 6,938,928 B2 | 9/2005 | Pfohl et al. |
| 7,019,626 B1 | 3/2006 | Funk |
| D525,550 S | 7/2006 | Egidio |
| D549,721 S | 8/2007 | Ito et al. |
| 7,270,209 B2 | 9/2007 | Suess |
| D552,121 S | 10/2007 | Carl et al. |
| D555,164 S | 11/2007 | Sergio |
| 7,299,122 B2 | 11/2007 | Perkins |
| 7,334,818 B2 | 2/2008 | Mascarenhas et al. |
| 7,341,164 B2 | 3/2008 | Barquist |
| 7,410,152 B2 | 8/2008 | Yates |
| 7,441,189 B2 | 10/2008 | Michaels |
| 7,444,986 B2 | 11/2008 | Shute |
| D600,701 S | 9/2009 | Kase |
| 7,607,630 B2 | 10/2009 | Jung et al. |
| 7,621,565 B2 | 11/2009 | Ross, Jr. et al. |
| 7,775,311 B1 | 8/2010 | Hardy et al. |
| 7,874,451 B2 | 1/2011 | Bell |
| 7,976,067 B2 | 7/2011 | Naganuma et al. |
| 7,979,522 B2 | 7/2011 | Lunsford |
| 8,055,603 B2 | 8/2011 | Fisher et al. |
| 8,125,346 B2 | 2/2012 | Ballard et al. |
| 8,282,132 B2 | 10/2012 | Griesbaum |
| D677,685 S | 3/2013 | Simmons et al. |
| 8,408,600 B2 | 4/2013 | Kondo et al. |
| D681,670 S | 5/2013 | Fletcher et al. |
| D686,244 S | 7/2013 | Moriya et al. |
| 8,498,799 B2 | 7/2013 | Matthews, Jr. et al. |
| 8,534,403 B2 | 9/2013 | Pursifull |
| D691,164 S | 10/2013 | Lim et al. |
| 8,550,274 B2 | 10/2013 | Gerding |
| 8,556,107 B2 | 10/2013 | McRobbie et al. |
| 8,820,289 B2 | 9/2014 | Green |
| 8,881,933 B2 | 11/2014 | Green |
| 8,882,071 B2 | 11/2014 | Green |
| D726,742 S | 4/2015 | Aoshima |
| 9,004,744 B1 | 4/2015 | Kemp |
| 9,031,763 B2 | 5/2015 | Green |
| D732,554 S | 6/2015 | Tomita et al. |
| D733,176 S | 6/2015 | Lin |
| D748,649 S | 2/2016 | Kovacevic et al. |
| D749,617 S | 2/2016 | Noack et al. |
| D750,114 S | 2/2016 | Kettner et al. |
| D750,120 S | 2/2016 | Kovacevic et al. |
| D755,202 S | 5/2016 | Seo |
| D759,704 S | 6/2016 | Kettner et al. |
| D760,275 S | 6/2016 | Zhang |
| 9,394,841 B1 | 7/2016 | Green |
| D766,942 S | 9/2016 | Napper et al. |
| D768,160 S | 10/2016 | McRae et al. |
| D768,161 S | 10/2016 | McRae et al. |

(56) References Cited

U.S. PATENT DOCUMENTS

| | | | |
|---|---|---|---|
| D768,661 S | 10/2016 | McRae et al. | |
| 2001/0037549 A1 | 11/2001 | Fenton | |
| 2002/0017088 A1 | 2/2002 | Dillon | |
| 2002/0029770 A1 | 3/2002 | Heffel et al. | |
| 2002/0030397 A1 | 3/2002 | Tamura et al. | |
| 2002/0078918 A1 | 6/2002 | Ancimer et al. | |
| 2003/0178422 A1 | 9/2003 | Kosuge et al. | |
| 2003/0187565 A1 | 10/2003 | Wong | |
| 2004/0003805 A1 | 1/2004 | Ono | |
| 2004/0011050 A1 | 1/2004 | Inoue | |
| 2004/0140412 A1 | 7/2004 | Hendzel et al. | |
| 2004/0148086 A1 | 7/2004 | Tafazoli et al. | |
| 2004/0158086 A1* | 8/2004 | White | B01J 21/18 |
| | | | 549/533 |
| 2005/0121005 A1 | 6/2005 | Edwards | |
| 2005/0230579 A1 | 10/2005 | Mascarenhas et al. | |
| 2006/0032532 A1 | 2/2006 | Suess | |
| 2006/0033322 A1 | 2/2006 | Suess | |
| 2006/0158961 A1 | 7/2006 | Ruscheweyh et al. | |
| 2006/0161315 A1 | 7/2006 | Lewis | |
| 2006/0245296 A1 | 11/2006 | Nishioka et al. | |
| 2007/0119421 A1 | 5/2007 | Lewis | |
| 2007/0277530 A1 | 12/2007 | Dinu et al. | |
| 2008/0023957 A1 | 1/2008 | Diehl | |
| 2008/0042028 A1 | 2/2008 | Ross | |
| 2008/0163627 A1 | 7/2008 | Elkady et al. | |
| 2009/0000842 A1 | 1/2009 | Hwang et al. | |
| 2009/0152043 A1 | 6/2009 | Lee | |
| 2009/0282810 A1 | 11/2009 | Leone | |
| 2009/0320786 A1 | 12/2009 | Fisher | |
| 2010/0045017 A1 | 2/2010 | Rea | |
| 2010/0051567 A1 | 3/2010 | Ross | |
| 2010/0078244 A1 | 4/2010 | Pursifull | |
| 2010/0127002 A1 | 5/2010 | Bel | |
| 2010/0263382 A1 | 10/2010 | Mancini et al. | |
| 2011/0087988 A1 | 4/2011 | Ray et al. | |
| 2011/0202256 A1 | 8/2011 | Sauve et al. | |
| 2011/0209074 A1 | 8/2011 | Gill et al. | |
| 2012/0001743 A1 | 1/2012 | Cotton et al. | |
| 2012/0060800 A1 | 3/2012 | Green | |
| 2012/0067660 A1 | 3/2012 | Kashu et al. | |
| 2012/0112533 A1 | 5/2012 | Yarmak et al. | |
| 2012/0253641 A1 | 10/2012 | Warner et al. | |
| 2012/0296552 A1 | 11/2012 | Matthews, Jr. et al. | |
| 2012/0310509 A1 | 12/2012 | Pardo et al. | |
| 2012/0325355 A1 | 12/2012 | Docheff | |
| 2013/0068905 A1 | 3/2013 | Green | |
| 2013/0069357 A1 | 3/2013 | Green | |
| 2013/0074816 A1 | 3/2013 | Green | |
| 2013/0092694 A1 | 4/2013 | Green | |
| 2013/0112768 A1 | 5/2013 | Hagenbuch | |
| 2013/0220274 A1 | 8/2013 | Deshpande | |
| 2013/0245864 A1 | 9/2013 | Frazier et al. | |
| 2013/0284747 A1 | 10/2013 | Rund | |
| 2013/0284748 A1 | 10/2013 | Sloan et al. | |
| 2013/0336084 A1 | 12/2013 | Janz | |
| 2014/0053800 A1 | 2/2014 | Steffen et al. | |
| 2014/0053816 A1 | 2/2014 | Czapka et al. | |
| 2014/0060946 A1 | 3/2014 | Willi | |
| 2014/0067236 A1 | 3/2014 | Henry | |
| 2014/0196687 A1 | 7/2014 | Coldren et al. | |
| 2014/0261301 A1 | 9/2014 | Leone | |
| 2015/0000643 A1 | 1/2015 | Green | |
| 2015/0020770 A1 | 1/2015 | Green | |
| 2015/0025774 A1 | 1/2015 | Green | |
| 2015/0142491 A1 | 5/2015 | Webb | |
| 2015/0199089 A1 | 7/2015 | Lee et al. | |
| 2015/0277750 A1 | 10/2015 | Sakaguchi | |
| 2015/0375666 A1* | 12/2015 | Woods, Sr. | B60P 1/433 |
| | | | 414/482 |
| 2016/0131007 A1 | 5/2016 | Kauderer et al. | |
| 2016/0138447 A1 | 5/2016 | Martin | |
| 2016/0138526 A1 | 5/2016 | Peters | |
| 2016/0162123 A1 | 6/2016 | Kurita et al. | |
| 2016/0257196 A1 | 9/2016 | Green | |
| 2016/0274075 A1 | 9/2016 | Ge | |

FOREIGN PATENT DOCUMENTS

| | | |
|---|---|---|
| WO | WO 2008/037175 | 4/2008 |
| WO | WO 2012/036768 | 3/2012 |
| WO | WO 2013/039708 | 3/2013 |
| WO | WO 2013/048812 | 4/2013 |
| WO | WO 2013/058988 | 4/2013 |
| WO | WO 2014/197594 | 12/2014 |
| WO | WO 2016/057239 | 4/2016 |
| WO | WO 2016/065026 | 4/2016 |
| WO | WO 2016/065109 | 4/2016 |
| WO | WO 2016/112156 | 7/2016 |

OTHER PUBLICATIONS

Caterpillar 785C Mining Truck Spec Sheet, 2010.

In-vehicle LPG Bottle with shield dated Oct. 30, 2007 [retrieved from internet on Nov. 25, 2015] https://commons.wikimedia.org/wiki/File:In-vehicle_LPG_bottle_012.JPG.

Chubb, Peter. 'Roku 3 vs. Apple TV 3G'. product-reviews.net [online]. Sep. 2, 2013 [retrieved Jun. 20, 2016]. Retrieved from the Internet: <URL: http://www.product-reviews.net/2013/09/02/roku-3-vs-apple-tv-3g/>.

'Testing Windows 8 apps using Visual Studio 2012'. Blogs.msdn.microsoft.com [online]. Aug. 20, 2012 [retrieved Jun. 20, 2016]. Retrieved from the Internet: <URL: https://blogs.msdn.microsoft.com/windowsappdev/2012/08/20/testing-windows-8-apps-using-visual-studio-2012/>.

'WPF How to create a lateral menu like this (Modern-UI)'. stackoverflow.com [online]. Apr. 2, 2014 [retrieved Jun. 20, 2016]. Retrieved from the Internet: <URL: http://stackoverflow.com/questions/22817624/wpf-how-to-create-a-lateral-menu-like-this-modern-ui>.

* cited by examiner

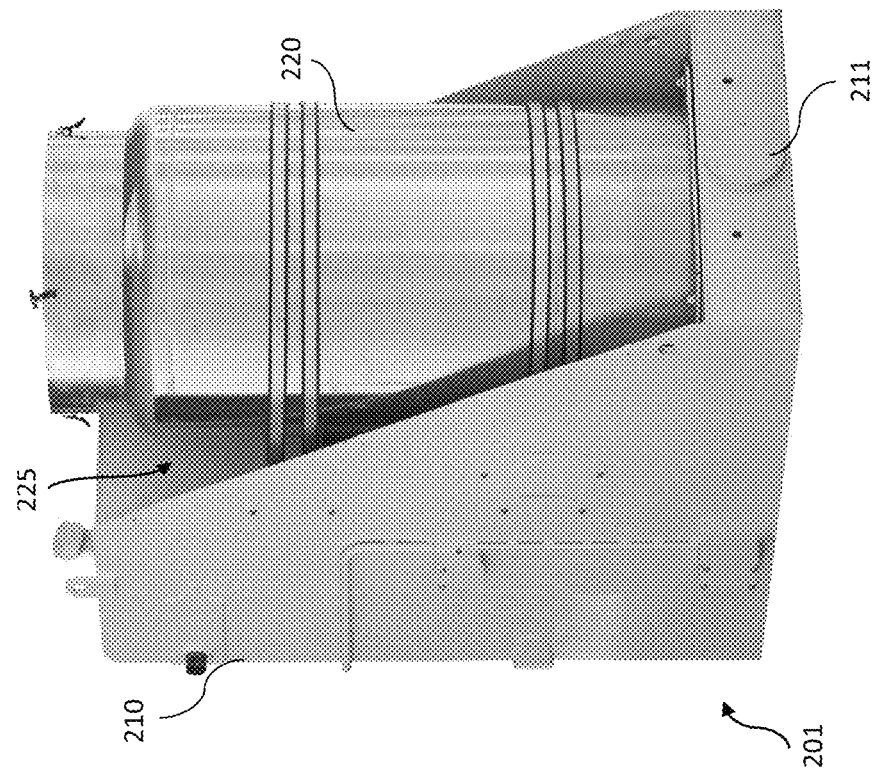
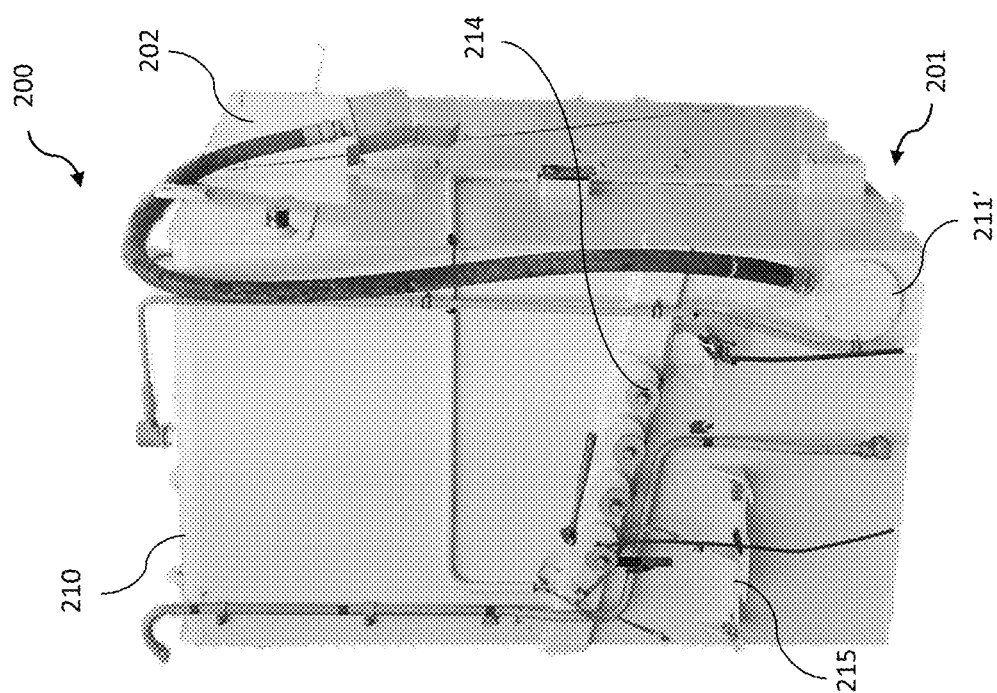
Figure 3
Figure 2

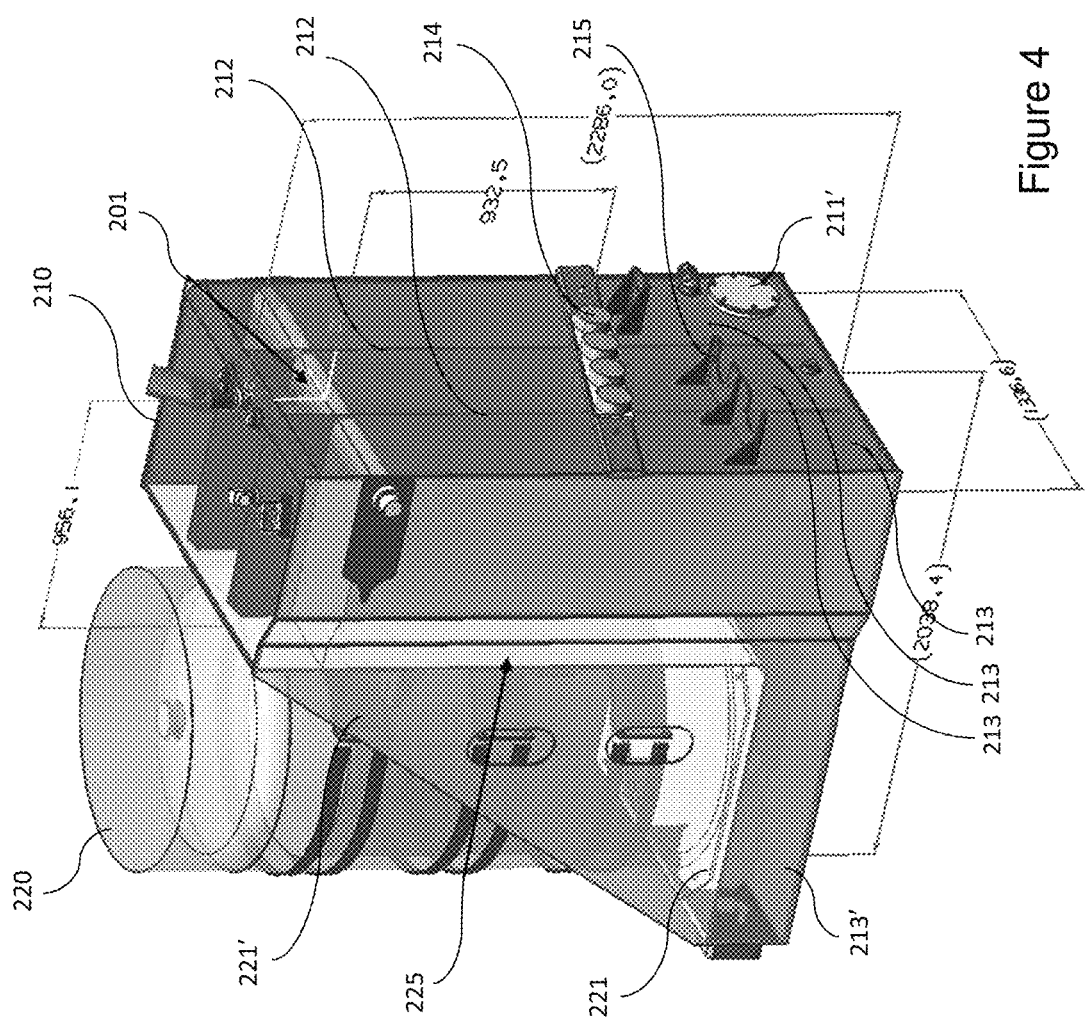

MODIFICATION OF AN INDUSTRIAL VEHICLE TO INCLUDE A HYBRID FUEL ASSEMBLY AND SYSTEM

CLAIM OF PRIORITY

The present application is a continuation-in-part application of previously filed, application having Ser. No. 14/520,848, filed on Oct. 22, 2014, which matured into U.S. Pat. No. 9,428,047 on Aug. 30, 2016, and is incorporated herein by reference. incorporated herein by reference.

BACKGROUND OF THE INVENTION

Field of the Invention

This invention relates to a hybrid fuel assembly and system for supplying an industrial vehicle with at least one alternate fuel supply. Specifically, at least one hybrid fuel assembly is mounted and disposed laterally on a side of the vehicle and in fluid communication with the vehicle, such as to increase the operational time and/or effectiveness of the vehicle.

Description of the Related Art

Mine haul trucks are off-highway, two axle, rigid dump trucks, specifically engineered for use in high production mining and heavy duty construction environments. As such, haul truck capacities typically range from 50 short tons (45 tons) to 400 short tons (363 tons). In addition, the largest and highest payload capacity of such mine haul trucks is referred to as "ultra class" trucks. This ultra class includes haul trucks having a payload capacity of at least 300 short tons or greater. Numerous manufacturers throughout the world produce such mammoth vehicles which are engineered for both performance and long operable life. Trucks of this type are developed specifically for high production duty wherein material is transported in large quantities in order to lower transportation costs on a cost-per-ton basis.

Typically mine haul trucks are powered by either direct drive diesel or diesel electric power trains frequently including a multiple horse power turbo charged diesel engine. Due to the exceptional size and weight of such vehicles, they cannot be driven on public access roads, but are ideal for high production environments wherein massive quantities of material must be moved, handled, relocated, etc. on a continuous or regular basis.

Accordingly, it is well recognized that distillate fuels, specifically diesel, are used as the primary fuel source for such vehicles. Attempts to maximize the operational efficiency, while maintaining reasonable safety standards, have previously involved modified throttle control facilities. These attempts serve to diminish adverse effects of control mechanisms which may be potentially harmful to the vehicle engine operation as well as being uneconomical. Typical adverse effects include increased fuel consumption and wear on operative components. Therefore, many diesel engines and the vehicles powered thereby are expected to accommodate various types of high capacity payloads and provide maximum power for relatively significant periods of operation. As a result, many diesel engines associated with heavy duty and off-road vehicles are commonly operated at maximum or near maximum capacity resulting in an attempted maximum power delivery from the vehicle engine and consequent high rates of diesel consumption. It is generally recognized that the provision of a substantially rich fuel mixture in the cylinders of a diesel engine is necessary for providing maximum power when required. Such continued high capacity operation of the vehicle engine results not only in wear on the engine components but also in high fuel consumption rates, lower operating efficiencies, more frequent oil changes and higher costs of operation.

Accordingly, there is a long recognized need for a fuel control system specifically intended for use with high capacity, off-road vehicles including mine haul vehicles of the type generally described above that would allow the use of more efficient fueling methods using other commonly available fuel sources. Therefore, an improved fuel control system is proposed which is determinative of an effective and efficient operative fuel mixture comprised of a combination of gaseous and distillate fuels. More specifically, gaseous fuel can comprise natural gas or other appropriate gaseous type fuels, wherein distillate fuel would typically include diesel fuel. Additionally, improved fuel control systems may further include increased capacity to carry lubricating fluids such as hydraulic fluid for powering a hydraulic lift or truck bed on such vehicles.

Such a preferred and proposed fuel control system should be capable of regulating the composition of the operative fuel mixture on which the vehicle engine currently operates to include 100% distillate fuel, when the vehicle's operating mode(s) clearly indicate that the combination of gaseous and distillate fuels is not advantageous. Further, such a proposed fuel control system could have an included auxiliary function to act as a general safety system serving to monitor critical engine fuel system and chassis parameters. As a result, control facilities associated with such a preferred fuel control system should allow for discrete, user defined control and safety set points for various engine, fuel system and chassis parameters with pre-alarm, alarm and fault modes.

In addition, the operation of such a fuel control system would be facilitated by the inclusion of a preferred mounting assembly for the alternate fuel supply. As such, the included and preferred mounting assembly would be readily adaptive for use on different vehicles while facilitating the secure, safe and efficient distribution of the alternate fuel in the intended manner.

SUMMARY OF THE INVENTION

This invention is directed to a system and attendant assembly to support at least one alternate fuel supply on a vehicle, wherein the fuel supply may be used with an improved fuel control system. The fuel control system may comprise controls for powering the hydraulic lift bed of a vehicle and appropriate injections of hydraulic fluid and lubricating fluid. The fuel control system may also comprise technology that allows for the safe and efficient use of a gaseous fuel such as, but not limited to, liquid natural gas (LNG), in combination with a predetermined quantity of conventional distillate fuel, such as diesel fuel. As a result, the composition of an "operative fuel mixture" used to power a vehicle engine will, dependent on the operating modes of the vehicle engine and operating characteristics of the engine during the operating modes, be either a predetermined combination of gaseous fuel and distillate fuel or substantially entirely distillate fuel, absent any contribution of gaseous fuel.

In initially broad terms, one embodiment of the present invention is directed to a system having a first hybrid fuel assembly, a second hybrid fuel assembly, and a fuel interconnect disposed on an industrial vehicle. As such, the first hybrid fuel assembly is disposed along a first side of the vehicle, preferably at a position laterally adjacent between the two tires, such as to provide sufficient clearance to the two tires. Similarly, the second hybrid fuel assembly is disposed along a second side of the vehicle, in a position laterally adjacent between the two tires of the second side of the vehicle. The vehicle is preferably a heavy duty industrial vehicle, such as a mine haul dump truck comprising Komatsu models 830 and 930. The fuel interconnect may be disposed on the vehicle and in fluid communication between the first and second fuel assemblies, such as to allow the refilling of both fuel assemblies from a single side of the vehicle.

At least one preferred embodiment of the present invention is directed to a hybrid fuel assembly that may be utilized in the system described above. Accordingly, the hybrid fuel assembly may comprise a mounting assembly, an auxiliary fuel tank, and a shield assembly. The shield assembly is cooperatively structured to operatively engage the mounting assembly in order to retain the auxiliary fuel tank therein. The mounting assembly comprises a primary fuel tank formed along a substantially hollow interior within the mounting assembly. The mounting assembly will also comprise a recessed portion or auxiliary fuel area dimensioned and structured to operatively retain the auxiliary fuel tank.

In at least one embodiment, the primary fuel tank is structured to contain diesel fuel and the mounting assembly is operatively connected in fluid communication with the vehicle and a powering engine thereof, in order to deliver the diesel fuel to effect the operation of the vehicle. In another embodiment, the primary fuel tank may be structured to contain hydraulic fluid, and the mounting assembly may be operatively connected in fluid communication with the vehicle and a hydraulic bed lift, in order to deliver hydraulic of lubricating fluid to effect the operation of the lift bed. In embodiments where the primary tank is intended to contain hydraulic fluid, the primary fuel tank may be smaller in proportion to the auxiliary fuel tank, because generally a mine haul dump truck requires less hydraulic fluid relative to diesel and/or LNG fuel. The auxiliary fuel tank is structured to contain liquefied nitrogen gas (LNG) fuel, and may comprise varying dimensions, inversely related to the size and dimension of the primary fuel tank.

The auxiliary fuel area may comprise an auxiliary fuel platform that is designed to retain the auxiliary fuel tank, such that the auxiliary fuel tank may be bolted down or otherwise attached to the platform. Additional auxiliary fuel retainers may be utilized to provide additional stability in securing the auxiliary fuel tank.

The mounting assembly of the hybrid fuel assembly will be cooperatively structured in order to operatively engage a mounting area of the industrial vehicle. As such, the mounting assembly may comprise at least one bracket or mounting structure which may be used to secure the mounting assembly to a side of the industrial vehicle. Further, additional shock absorber bushings may be added to minimize movement and/or absorb a portion of the force of impact against a side of the industrial vehicle during transit.

At least one fuel access port will be integrated within the mounting assembly. In at least one embodiment, a second mounting assembly may comprise a rear fuel access port, which may be in fluid communications with the fluid interconnect, in order to enable the refueling of the mounting assembly from a first mounting assembly on another side of the vehicle. In a preferred embodiment, a first mounting assembly may comprise a front diesel access port, a LNG access port, as well as a hydraulic refill port for refilling the various fuels and/or fluids necessary for the operation of the vehicle.

The primary fuel tank formed within the mounting assembly may further comprise at least one baffle. The baffle is formed along an interior of the primary fuel tank in order to partition the primary fuel tank into a plurality of primary fuel compartments. This provides the benefit of minimizing slosh dynamics, so unwanted aeration does not occur in the fuel during the transit of the vehicle at high speeds and/or on rugged terrain. A plurality of structural baffles may be formed along the interior of the primary fuel tank to further bolster the structural integrity of the primary fuel tank and hybrid fuel assembly. The baffles may be disposed in varying configurations to provide for additional weight stability of the hybrid fuel assembly.

In at least one embodiment, the mounting assembly may further comprise an access ladder, which is sufficiently dimensioned and disposed to allow an operator to gain access to a bed hoist cylinder of the vehicle and/or a hydraulic truck bed lift of the vehicle. Additional access points or areas may be built into the mounting assembly, such as to allow access to a LNG vaporizer integrated on a lower exterior of the mounting assembly.

These and other objects, features and advantages of the present invention will become clearer when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which:

FIG. 2 is a perspective view of a hybrid fuel assembly for providing at least one alternate fuel supply to an industrial vehicle, specifically the fuel assembly may comprise diesel and liquefied natural gas.

FIG. 3 is a front perspective view in partial cutaway of the hybrid fuel assembly of FIG. 2.

FIG. 4 is rear perspective view in partial cutaway of the hybrid fuel assembly of FIG. 2, illustrating the internals of the primary fuel tank.

Like reference numerals refer to like parts throughout the several views of the drawings.

DETAILED DESCRIPTION OF THE PREFERRED EMBODIMENT

As illustrated by the accompanying drawings, the present invention is directed to an assembly and system for modifying an industrial vehicle to include at least one alternate fuel supply used to facilitate the operation of the vehicle.

Figure 1:
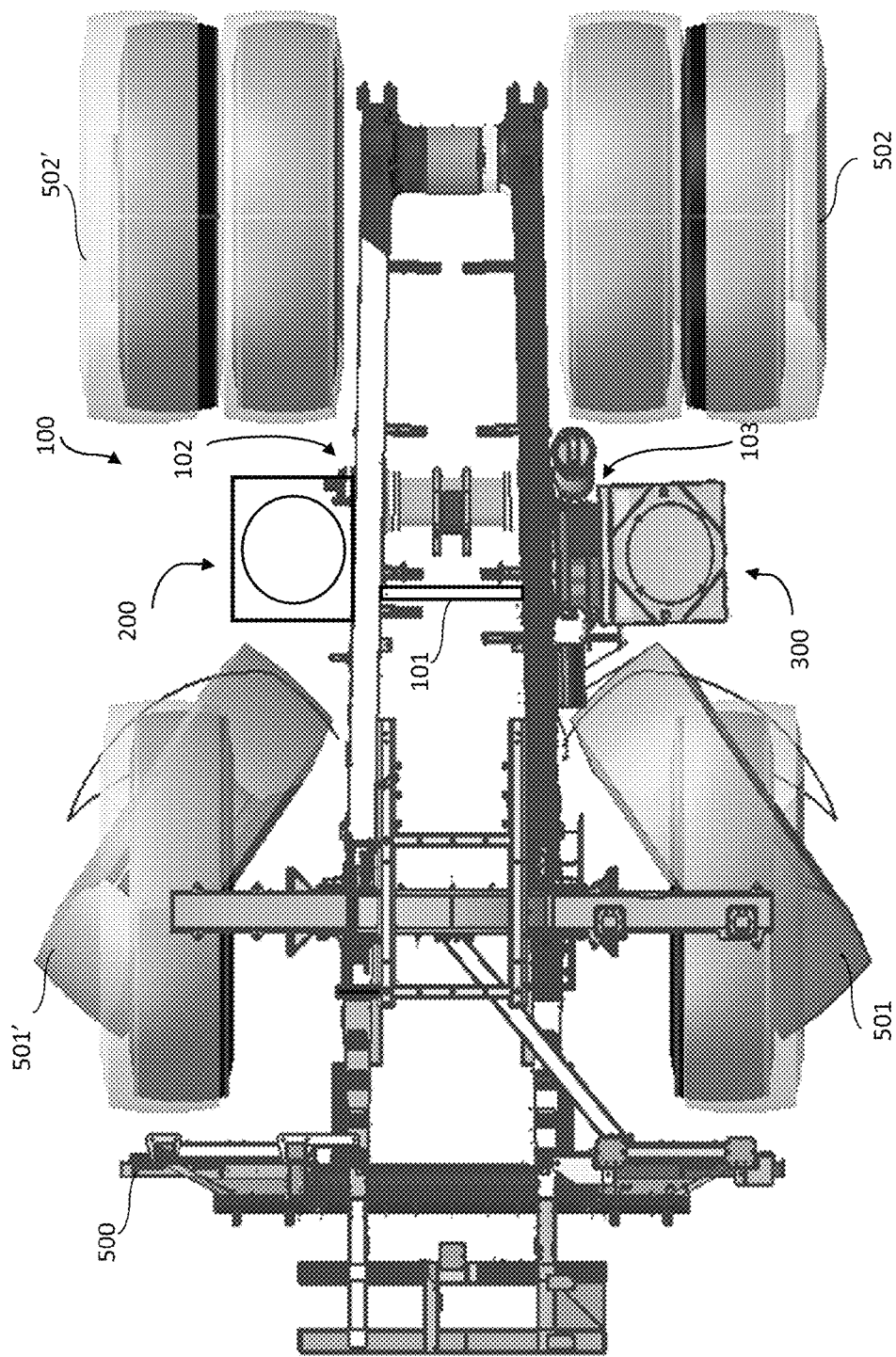
FIG. 1 is a top schematic view of a system for implementing at least one alternate fuel supply to facilitate the operation of an industrial vehicle, specifically, first and second hybrid fuel assemblies are mounted on the lateral portions of the vehicle and in fluid communication with a powering engine of the vehicle.

Drawing attention to FIG. 1, a system 100 of the present invention may comprise a first hybrid fuel assembly 300, a second hybrid fuel assembly 200, and a fuel interconnect 101 disposed on an industrial vehicle 500. Accordingly, the first hybrid fuel assembly 300 is disposed along an exterior of the vehicle 500, preferably at a mounting area 103 which is laterally adjacent between the two tires 501 and 502 on a first side of the vehicle 500. Similarly, the second hybrid fuel assembly 200, if any, may be disposed at a mounting area 102 which is laterally adjacent between the two tires 501' and 502' on a second side of the vehicle 500. Each of the first and second hybrid fuel assemblies 200, 300 are sufficiently structured and disposed such as to provide the tires 501, 502, 501', 502' with sufficient clearance taking in account of tire rotation.

The industrial vehicle 500 may comprise any type of heavy duty industrial vehicles such as mine haul vehicles, dump trucks, bull dozers, and other commercial vehicles known to those skilled in the art. In a preferred embodiment, the present invention is designed to operatively engage and operate on commercial dump trucks, including but not limited to Komatsu models 830E, 830E-AC, 930E, 930E-4, 930E-4SE, and other present and future variations of these models.

In a preferred embodiment, the first fuel assembly 300 comprises a hydraulic and liquefied natural gas (LNG) hybrid assembly, while the second fuel assembly 200 comprises a diesel and LNG hybrid assembly. The hydraulic fluid may be used to facilitate the operation of a hydraulic truck bed lift of the vehicle 500. The diesel fuel and LNG may be used for powering a drive train of the vehicle 500. The fuel interconnect 101 may be in fluid communication between the first fuel assembly 300 and the second fuel assembly 200, such as to allow the refilling of both assemblies and respective tank(s) thereof from a single side of the industrial vehicle 500. In other embodiments, either the hybrid fuel assembly 200 or 300 may also be mounted singularly on a side of the vehicle, leaving the other side of the vehicle empty, and in such an embodiment a fluid interconnect 101 between the two assemblies may be omitted. Each of the first and second fuel assemblies 200, 300 are described in greater detail below.

As represented in FIGS. 2-4, one illustrative embodiment of a hybrid fuel assembly 200 is shown to initially comprise a mounting assembly 201, an auxiliary fuel tank 220, and a shield assembly 202. The shield assembly 202 is cooperative structured to operatively engage the mounting assembly 201 in order to retain the auxiliary fuel tank 220 therein, and to protect both the auxiliary fuel tank 220 and the mounting assembly 201 from the external environment. The shield assembly 202 may accordingly be thermal insulated and/or be formed of sufficiently rigid material(s).

The mounting assembly 201 comprises a primary fuel tank 210 formed along a hollow interior within said mounting assembly 201. The mounting assembly 201 further comprises an auxiliary fuel area 225 sufficiently dimensioned and structured to operatively retain the auxiliary fuel tank 220. The mounting assembly 201 may be formed in the dimensions of a substantially trapezoidal prism with a hollow interior on a diagonal side structured to retain the auxiliary fuel tank 220, such as at the auxiliary fuel area 225.

In at least one embodiment, the primary fuel tank 210 is structured to contain diesel fuel for powering an engine and/or drive train of the vehicle 500, whereas the auxiliary fuel tank 220 is structured to contain LNG as an alternate fuel also for powering an engine and/or drive train of the vehicle 500. The primary fuel tank 210 may comprise approximately 650 gallons of useable diesel fuel, but may also comprise diesel fuel amounts in the 500 to 700 gallon range, in various embodiments designed for the Komatsu 830 or 930 model dump trucks. The auxiliary fuel tank 220 containing LNG may then comprise corresponding sizes, in order to accommodate the relatively larger diesel fuel capacity, and so as to not overload the weight bearing capacity on a side of the vehicle 500. For example, the larger the primary fuel tank 210 capacity, the smaller the auxiliary fuel tank 220 capacity.

Auxiliary fuel area 225 may further comprise an auxiliary fuel platform 221 which is substantially flat and designed to retain the auxiliary fuel tank 220, such that auxiliary fuel tank 220 may be bolted down onto the platform 221. In order to provide additional stability to the attachment of the auxiliary fuel tank 220, auxiliary fuel area 225 may further comprise additional auxiliary fuel retainers 222 shaped to conform to an exterior of the auxiliary fuel tank 220. These auxiliary fuel retainers 222 may form arch-like structures that are in abutting and partially surrounding relations to the auxiliary fuel tank 220, when the auxiliary fuel tank 220 is operatively disposed and engaged with the auxiliary fuel area 225.

In order to affix the hybrid fuel assembly 200 to the vehicle 500, the mounting assembly 201 is cooperatively structured to operatively engage a mounting area of the industrial vehicle. The mounting area is preferably located at an area laterally adjacent between the two tires on a side of the vehicle, such as illustrated in FIG. 1 at mounting areas 102 or 103. To facilitate the operative engagement of the mounting assembly 201 to a mounting area of the vehicle, the mounting assembly 201 may further comprise at least one bracket 215 for affixing or mounting the mounting assembly 201 to the industrial vehicle 500. A plurality of bushings or shock absorber bushings 214 is preferably formed along a rear exterior of the mounting assembly 201, such as to absorb and minimize the force of impact against a side of the industrial vehicle 500, and/or to provide a cushion and minimize movement of the mounting assembly relative to the industrial vehicle 500 when the vehicle is operating at high speeds and/or on rough terrain. The shock absorber bushings 214 may be formed from a number of shock absorbing materials, such as polymers, visco-elastic polymers, visco polymers, rubber, neoprene, silicone, and the like.

Mounting assembly 201 may additionally comprise a front fuel access port 211, and may further comprise a rear fuel access port 211'. In embodiments where each of two hybrid fuel assemblies 200 are mounted on each of two sides of a vehicle, a user may utilize the rear fuel access port 211' of one hybrid fuel assembly 200, in fluid connection with a fuel interconnect to the other hybrid fuel assembly 200, such that the user may refuel both hybrid fuel assemblies 200 from on a single side of the vehicle. The fuel access ports 211, 211' may be in fluid communication with the primary fuel tank 210 in at least one embodiment, but may also be in communication with the auxiliary tank 220 in other embodiments. Additional and separate fuel access ports may be used for the auxiliary tank 220 in yet other embodiments. Mounting assembly 201 is also structured and disposed to facilitate the operative communication of its primary fuel tank 210 and auxiliary fuel tank 220 with a powering engine, drivetrain, and/or other mechanical or electrical operations of the vehicle.

Drawing attention to FIG. 4, a partially rear cut away view further illustrates the details of the primary fuel tank 210 formed along an interior of the mounting assembly 201. Accordingly, and in a preferred embodiment, the primary fuel tank 210 comprises at least one baffle 212 formed along an interior of the primary fuel tank 210. The baffle 212 is structured and disposed to partition the primary fuel tank 210 into a plurality of primary fuel compartments 213. In preferred embodiments, a plurality of structural baffles 212 are formed along an interior of the primary fuel tank 210 to bolster the structural integrity of the mounting assembly 201. This is particularly advantageous due to the substantially hollow interior of the mounting assembly 201 used for storage of a fuel.

The resulting smaller primary fuel compartments 213 is also advantageous because it reduces the slosh dynamics of the liquid fuel, and thus results in a higher efficiency of operation for the vehicle. Further, reduced slosh dynamics also decreases the amount of entrained air or cavitation in diesel fuel, which may otherwise cause retarded injection timing and thus negatively affect diesel engine performance. In at least one embodiment, the primary fuel tank 210 additionally comprises at least one primary fuel compartment 213' disposed in underlying relations relative to the auxiliary fuel platform 221. The existence of the lower fuel compartment 213' provides further weight stability to the hybrid fuel assembly 200, and reduces potential movement of the assembly 200 relative to the vehicle 500, which offers another added advantage particularly when the vehicle 500 is functioning on uneven and off-road terrain.

Figure 5:
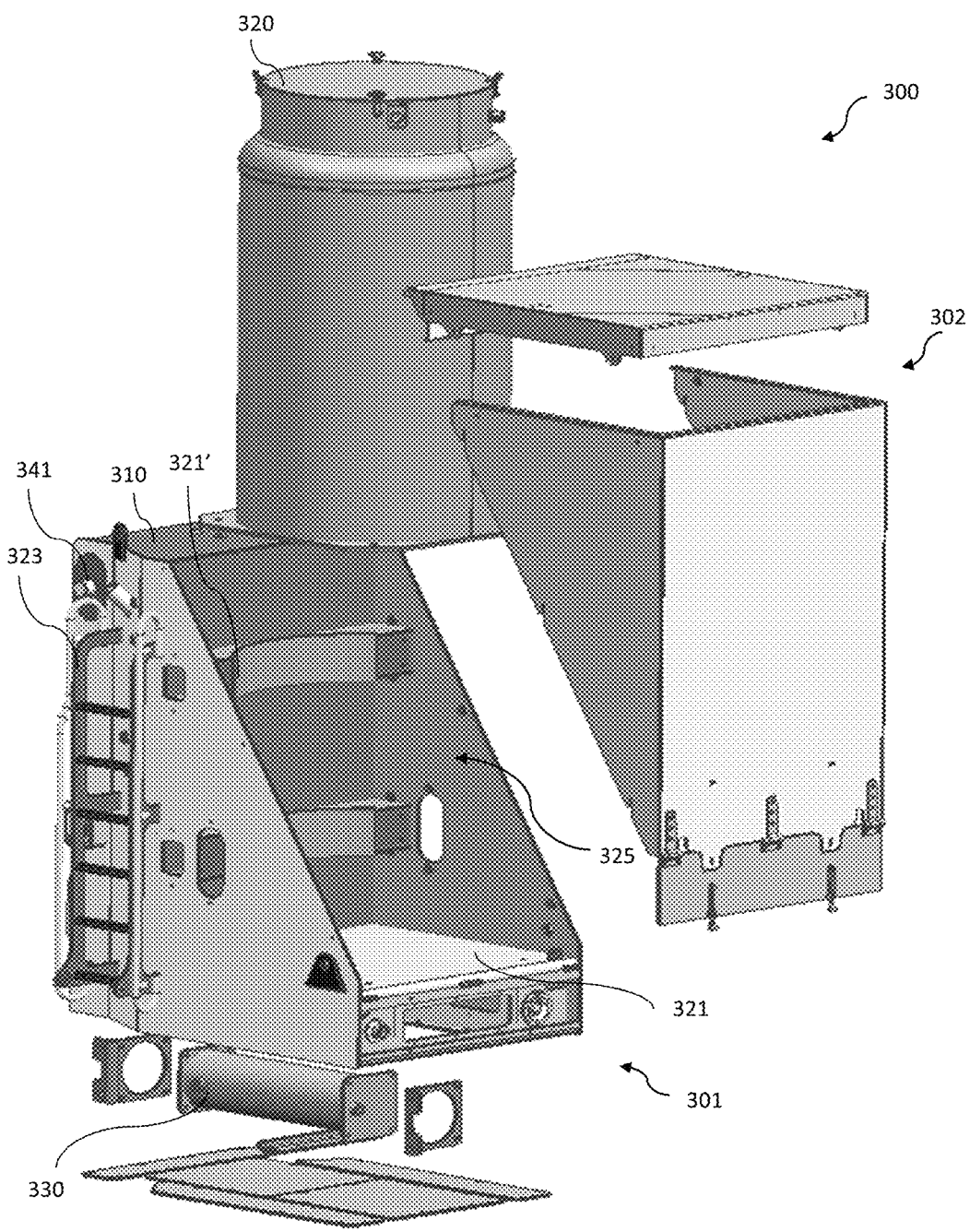
FIG. 5 is a perspective view in exploded form of another hybrid fuel assembly for providing at least one alternate fuel supply to an industrial vehicle, specifically the fuel assembly may comprise hydraulic fluid and liquefied natural gas.

As represented in FIGS. 5-9, another illustrative embodiment of a hybrid fuel assembly 300 is shown, also for mounting on a side of the vehicle 500. Similarly, this embodiment initially comprises a mounting assembly 301, an auxiliary fuel tank 320, and a shield assembly 302, which may comprise a two piece construction as illustrated in FIG. 5. Similar to the above embodiment, the shield assembly 302 is cooperative structured to operatively engage the mounting assembly 301 in order to retain the auxiliary fuel tank 320 therein, and to protect both the auxiliary fuel tank 320 and the mounting assembly 301 from the external environment. The shield assembly 302 may accordingly be thermal insulated and/or be formed of sufficiently rigid material(s).

The auxiliary fuel tank 320 is similar to the hybrid fuel assembly 200 above, but may comprise differential sizes, shapes, and/or dimensions. The mounting assembly 301 also comprises a primary fuel tank 310 formed along a hollow interior within the mounting assembly 301, and may share certain characteristics and components of the mounting assembly 201 above. The mounting assembly 201 may similarly be formed in the dimensions of a substantially trapezoidal prism, having a hollow interior along a diagonal side structured to retain the auxiliary fuel tank 320, such as at the auxiliary fuel area 325. The hybrid fuel assembly 300 further comprises a LNG vaporizer 330, as well as additional components on the mounting assembly 301 that will be discussed in greater detail below.

In a preferred embodiment, the primary fuel tank 310 is structured to contain hydraulic fluid for powering a hydraulic truck bed lift of the vehicle 500, whereas the auxiliary fuel tank 320 is structured to contain LNG as an alternate fuel for powering an engine and/or drive train of the vehicle 500. The primary fuel tank 310 may comprise approximately 246 gallons of hydraulic fluid, while the auxiliary fuel tank 320 may comprise approximately 300 gallons of LNG. Other preferred ranges may comprise 200-300 gallons of hydraulic fluid in the primary fuel tank 310, and 250-350 gallons of LNG in the auxiliary fuel tank 320. Fewer amounts of hydraulic fluid relative to LNG may be used depending on the utilization of the truck's hydraulic truck bed lift versus the range of travel of the vehicle 500.

The auxiliary fuel area 325 may similarly comprise an auxiliary fuel platform 321 as well as auxiliary fuel retainers 322. The auxiliary fuel platform 321 is formed along a lower interior of said mounting assembly 301, and is substantially flat and structured to retain the auxiliary fuel tank 320, such that the auxiliary fuel tank 320 may be bolted down or otherwise affixed to the platform 321. Auxiliary fuel retainers 322 may further be used to provide added stability to the auxiliary fuel area 325, the retainers 322 may be shaped to at least partially conform to an exterior of the auxiliary fuel tank 320. The retainers 322 may, as illustrated in FIG. 5, form partially arching structures that are in abutting and partially surrounding relations to the auxiliary fuel tank 320 when the auxiliary fuel tank 320 is disposed in an operative engagement with the auxiliary fuel area 325.

The mounting assembly 301 may also comprise similar structural components for facilitating the mounting of the hybrid fuel assembly 300 to the vehicle 500. Preferably, the hybrid assembly will also be mounted at an area laterally adjacent between the two tires on a side of the vehicle, such as at areas 102 or 103 in accordance with FIG. 1. To facilitate the operative engagement of the mounting assembly 301 with the industrial vehicle 500, similar mounting brackets, not shown, may be utilized. However, in a preferred embodiment and design for the Komatsu dump truck vehicles models 830 and 930, the present hybrid fuel assembly 300 is intended to replace and improve upon an existing manufacturer hydraulic tank. Accordingly, the mounting assembly 301 may comprise mounting structures 341 on each side of the mounting assembly 301. These mounting structures 341 are structured to be backwards compatible with an existing mount area on the vehicle 500. Mounting assembly 301 may similarly comprise a plurality of bushings or shock absorber bushings 314 using like materials described above, so as to minimize movement and/or absorb the force of impact against a side of the industrial vehicle 500 during transit in rugged terrain.

Mounting assembly 301 preferably comprises separate fuel access ports for refilling the various fuels or alternate fuels used for operation of the vehicle 500. In the preferred embodiment of hybrid fuel assembly 300, the mounting assembly 301 may comprise a LNG access port 315, a diesel access port 316, and a hydraulic refill port 350. The diesel access port 316 is intended to interconnect with a primary tank of another mounting assembly, such as the primary tank 210 of mounting assembly 201 recited in the previous embodiment above, via the fuel interconnect 101. The LNG access port 315 may comprise a fuel connection or interconnect that is connected to and in fluid communication with the auxiliary tank 320. In at least one embodiment, the LNG access port 315 may further be connected to and in fluid communication with the auxiliary tank 220 of the separate fuel assembly 200. The hydraulic refill port 350 is connected to and in fluid communication with the primary tank 310 of the mounting assembly 301. Each of the above fuel access ports or refill ports may further comprise additional components to facilitate the expedient refill of the respective fuels or fluids. For example, a fuel access port may further comprise a one-way check valve to prevent backflow and/or spillage during refill operations.

Figure 7:
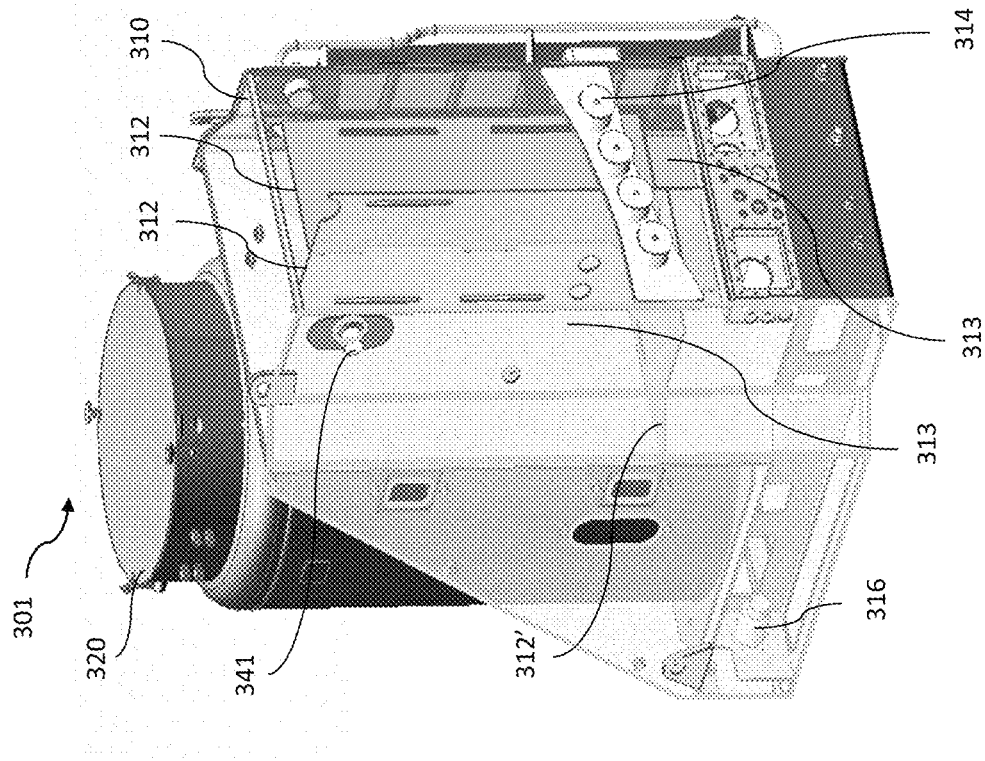
FIG. 7 is a rear perspective view in partial cutaway of the hybrid fuel assembly of FIG. 5, illustrating the internals of the primary fuel tank.
Figure 6:
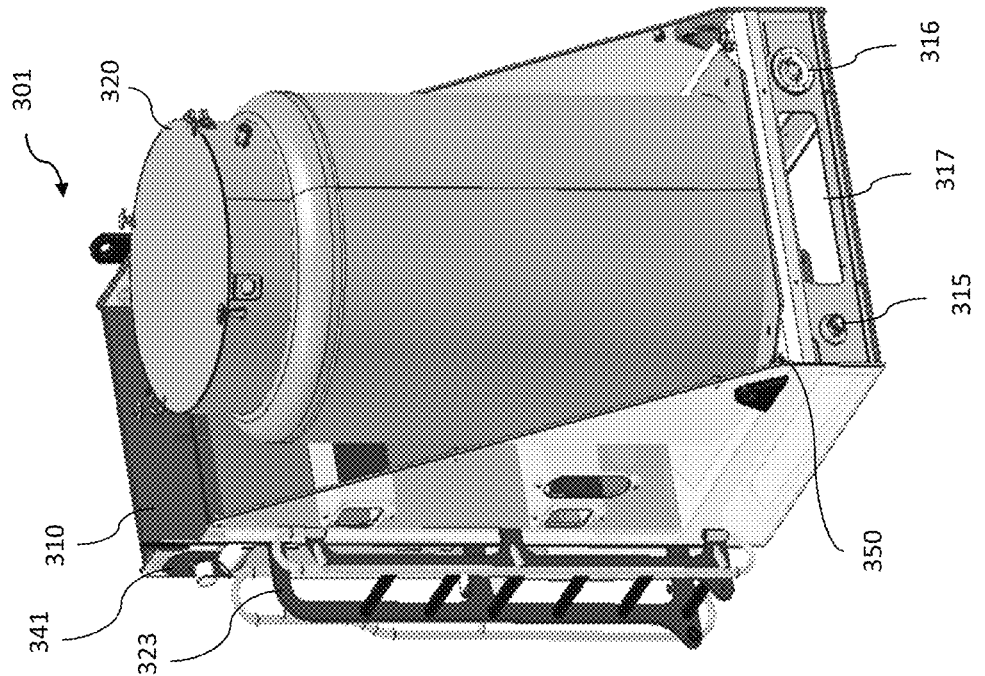
FIG. 6 is a front perspective view in partial cutaway of the hybrid fuel assembly of FIG. 5.
Figure 8:
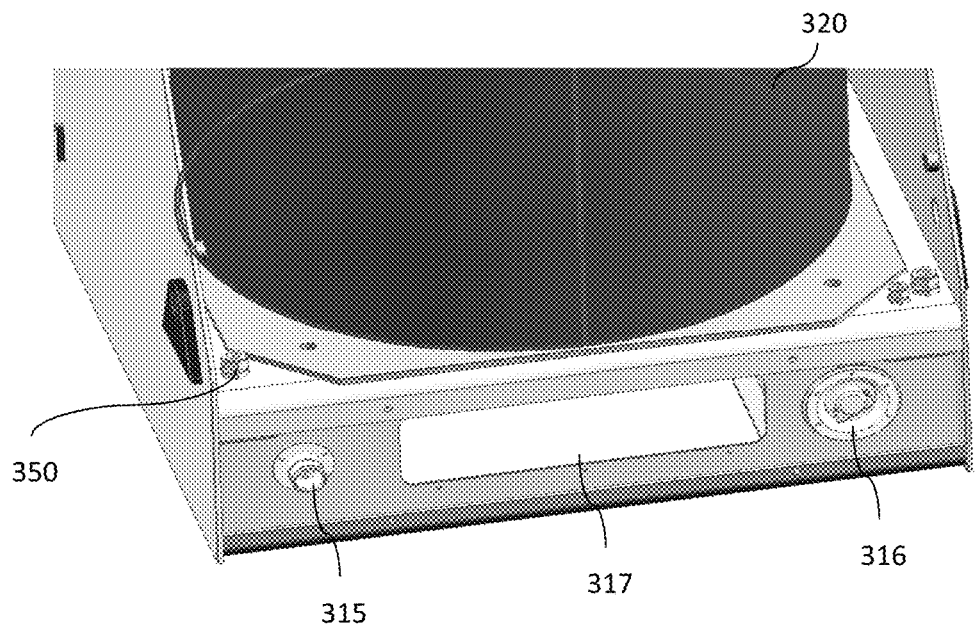
FIG. 8 is a detailed perspective view in partial cutaway of a front lower portion of the hybrid fuel assembly of FIG. 5, illustrating the fuel access ports.
Figure 9:
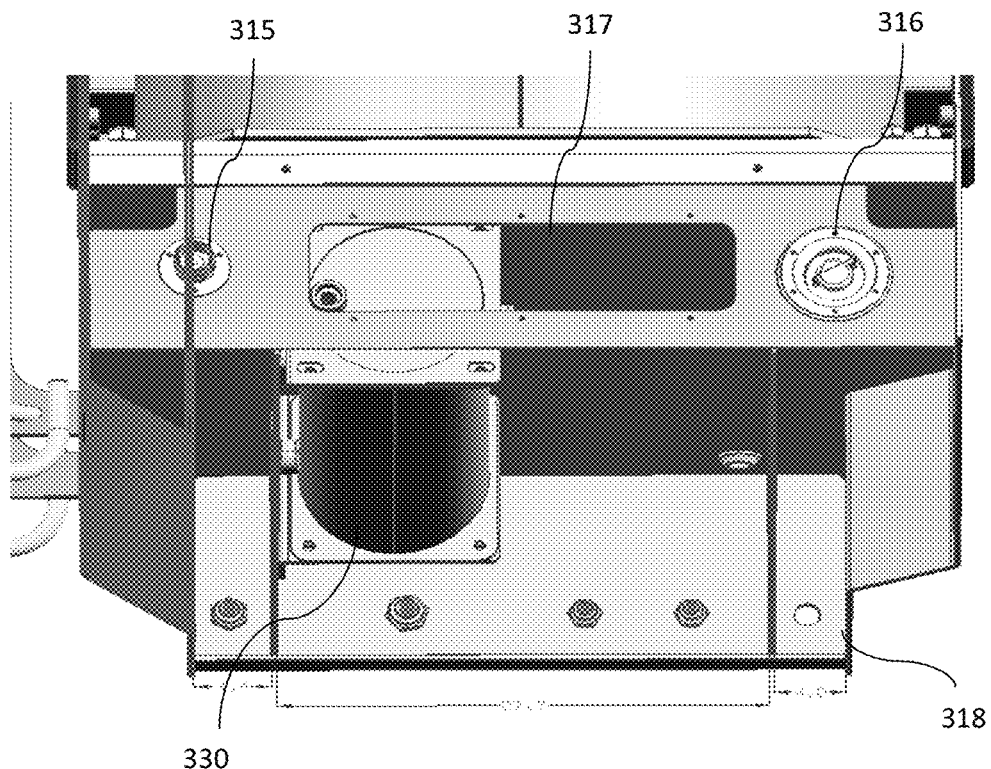
FIG. 9 is a detailed perspective view of a bottom portion of the hybrid fuel assembly of FIG. 5, illustrating the integrated vaporizer and vaporizer access area.

As illustrated in FIG. 7, the primary fuel tank 310 formed along the interior of the mounting assembly 301 may also similarly comprise at least one baffle 312. The baffle 312 is formed along an interior of the primary fuel tank 310 and is structured and disposed to partition the primary fuel tank into a plurality of primary fuel compartments 313. Two or more structural baffles 312 may be formed within the primary fuel tank 310 and be of sufficient form, material, and dimension to increase the structural integrity of the overall primary fuel compartment 313 and hybrid fuel assembly 300. The structural baffles 312 may be formed, such that a first baffle 312 is in juxtaposing disposition and perpendicularly disposed relative to a second baffle 312, which results in at least three primary fuel compartments 313 as shown in FIG. 7. Additional horizontal baffles 312' may be formed to further increase the number of primary fuel compartments 313 and/or the overall structural integrity of the primary fuel tank 310. Fewer or greater structural baffles 312 may be used depending on the size and dimension of the mounting assembly 301 and corresponding primary fuel tank 310.

The resulting smaller primary fuel compartments 313 provides the added benefit of reducing slosh dynamics of the hydraulic fluid. Fluid aeration causes notable problems in hydraulic and lubrication oil systems, including unaccepted noise, poor component response due to the spongy behavior of aerated fluids, cavitation damage as well as severe fluid degradation. Accordingly, because a reduction in slosh dynamics reduces the entrained air in the fluids, these problems may be overcome. A lower fuel compartment may not be necessary in this embodiment, due to the smaller primary fuel tank size 310 and relatively larger auxiliary fuel tank 320, which provides sufficient weight to stabilize the overall hybrid fuel assembly 300 during vehicle 500 function on even or off-road terrain.

The mounting assembly 301 may further comprise an access ladder 232. The access ladder 232 and mounting assembly 301 is sufficiently dimensioned and disposed such as to allow an operator to gain access to the access ladder 232 in order to access a bed hoist cylinder on the vehicle 500 having a hydraulic truck bed lift. This allows an operator to properly access and maintain a hydraulic truck bed lift of a vehicle 500. Drawing attention to FIGS. 8-9, additional access areas are provided for the convenient access of the LNG vaporizer 330. A front vaporizer access 317 and/or a bottom vaporizer access 318 may be provided to facilitate the connection and maintenance of the LNG vaporizer 330 to the mounting assembly 301 and the auxiliary fuel tank 320 which comprises the LNG. According, the vaporizer access 317 or 318 may comprise a sufficiently large opening such as to allow an operator to gain access to said LNG vaporizer or vaporizer 330. In some embodiments, access area 317 may comprise a display panel integrated with electronic sensor(s) for displaying the current status of the hybrid fuel assembly 300, and may comprise fuel status, fill level, maintenance schedule, error codes, etc. The LNG vaporizer 330 is structured and configured to convert the LNG into a gas for use by a powering engine of the vehicle 500.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,
What is claimed is:

1. A hybrid fuel assembly for modifying an industrial vehicle to include at least one alternate fuel supply, said assembly comprising:

a mounting area disposed on the industrial vehicle, said mounting area sufficiently dimensioned and structured to operatively retain a mounting assembly,
said mounting assembly cooperatively structured to operatively engage said mounting area, wherein said mounting assembly comprises:
a primary fuel tank formed along a hollow interior within said mounting assembly for holding hydraulic fluid,
an auxiliary fuel area sufficiently dimensioned and structured to operatively retain an auxiliary fuel tank for holding liquefied nitrogen gas,
said auxiliary fuel tank cooperatively structured to operatively engage said auxiliary fuel area,
a shield assembly structured to enclose and secure the auxiliary fuel tank within said auxiliary fuel area on said mounting assembly,
said mounting assembly further structured and disposed to facilitate operative communication of said primary fuel tank with a hydraulic lift bed of the vehicle, and
said mounting assembly further structured and disposed to facilitate operative communication of said auxiliary fuel tank with a powering engine of the vehicle.

2. The assembly as recited in claim 1 further comprising a vaporizer structured and configured to convert the liquefied natural gas into a gaseous state for use by a powering engine of the vehicle.

3. The assembly as recited in claim 2 wherein said vaporizer is mounted in an area substantially beneath said mounting assembly.

4. The assembly as recited in claim 2 wherein said mounting assembly further comprises a vaporizer access sufficiently dimensioned to facilitate the maintenance of said vaporizer by an operator.

5. The assembly as recited in claim 4 wherein said vaporizer access comprises an opening substantially beneath said mounting assembly.

6. The assembly as recited in claim 1 wherein said auxiliary fuel area further comprises an auxiliary fuel platform formed along a lower interior of said mounting assembly.

7. The assembly as recited in claim 6 wherein said vaporizer is disposed in underlying relation to said auxiliary fuel platform.

8. The assembly as recited in claim 1 wherein said auxiliary fuel area comprises at least one auxiliary fuel retainer formed along a rear interior of said mounting assembly, said auxiliary fuel retainer shaped to conform to an exterior of said auxiliary fuel tank.

9. The assembly as recited in claim 8 wherein said auxiliary fuel retainer comprises a partially arching structure formed to engage said auxiliary fuel tank in abutting and partially surrounding relations, when said auxiliary fuel tank is disposed in an operative engagement with said auxiliary fuel area.

10. The assembly as recited in claim 1 wherein said mounting assembly comprises at least one hydraulic refill port in fluid communication with said primary fuel tank.

11. The assembly as recited in claim 1 wherein said mounting assembly further comprises a diesel access port in fluid communication with a fluid interconnect.

12. The assembly as recited in claim 11 wherein said fluid interconnect is in fluid communication with said diesel access port and a second hybrid fuel assembly.

13. The assembly as recited in claim 1 wherein said mounting assembly further comprises a liquefied nitrogen gas access port in fluid communication with said auxiliary fuel tank.

14. The assembly as recited in claim 1 wherein said primary fuel tank comprises at least one baffle formed along an interior of said primary fuel tank, said at least one baffle structured and disposed to partition said primary fuel tank into a plurality of primary fuel compartments.

15. The assembly as recited in claim 14 wherein said plurality of primary fuel compartments are sufficiently shaped and dimensioned to reduce the slosh dynamics of said primary fuel compartment.

16. The assembly as recited in claim 14 wherein said primary fuel tank comprises a first baffle in juxtaposing disposition and perpendicularly disposed relative to a second baffle.

17. The assembly as recited in claim 1 wherein said mounting assembly further comprises a plurality of shock absorber bushings.

18. The assembly as recited in claim 1 wherein said mounting assembly further comprises at least one mounting structure.

19. The assembly as recited in claim 1 wherein said mounting assembly further comprises an access ladder disposed on a side of said mounting assembly, and sufficiently dimensioned as to allow an operator to gain access to a bed hoist cylinder of the vehicle.

20. The assembly as recited in claim 1 wherein said auxiliary fuel tank comprises between approximately 250 to 350 gallons of liquefied natural gas.

21. The assembly as recited in claim 1 wherein said primary fuel tank comprises between approximately 200 to 300 gallons of hydraulic fluid.

22. The assembly as recited in claim 1 wherein the mounting area is disposed laterally adjacent between two tires on a side of the vehicle.

23. The assembly as recited in claim 1 wherein said auxiliary fuel tank comprises a liquid volume greater than a liquid volume of said primary fuel tank.

24. The assembly as recited in claim 1 wherein the vehicle is a heavy duty industrial vehicle.

25. The assembly as recited in claim 1 wherein the vehicle comprises a mine haul dump truck.

\* \* \* \* \*